(12) United States Patent
Suchý

(10) Patent No.: US 12,586,934 B2
(45) Date of Patent: Mar. 24, 2026

(54) MULTI-CONNECTION BRACKET AND METHODS OF USE

(71) Applicant: Intelligrated Headquarters, LLC, Mason, OH (US)

(72) Inventor: Jan Suchý, Zlin (CZ)

(73) Assignee: Intelligrated Headquarters, LLC, Mason, OH (US)

( * ) Notice: Subject to any disclaimer, the term of this patent is extended or adjusted under 35 U.S.C. 154(b) by 127 days.

(21) Appl. No.: 18/453,552

(22) Filed: Aug. 22, 2023

(65) Prior Publication Data

US 2025/0070487 A1      Feb. 27, 2025

(51) Int. Cl.
| | |
|---|---|
| *H01R 4/64* | (2006.01) |
| *B65G 19/28* | (2006.01) |
| *B65G 41/00* | (2006.01) |
| *F16B 5/06* | (2006.01) |
| *F16B 7/04* | (2006.01) |
| *H01R 4/2407* | (2018.01) |

(52) U.S. Cl.
CPC ............. *H01R 4/64* (2013.01); *B65G 19/287* (2013.01); *B65G 41/00* (2013.01); *F16B 7/0406* (2013.01); *H01R 4/2407* (2018.01); *F16B 2005/0678* (2013.01); *F16B 2200/93* (2023.08)

(58) Field of Classification Search
CPC ...... H01R 4/64; H01R 4/2407; B65G 19/287; B65G 41/00; F16B 7/0406; F16B 2005/0678; F16B 2200/93
USPC ................................. 198/735.2, 735.6, 860.1
See application file for complete search history.

(56) References Cited

U.S. PATENT DOCUMENTS

| | | | |
|---|---|---|---|
| 2,038,203 A | * 4/1936 | Banks | H01R 4/64 |
| | | | 439/805 |
| 4,560,059 A | * 12/1985 | Braun | B65G 19/287 |
| | | | 403/353 |
| 4,982,835 A | 1/1991 | Butler et al. | |
| 5,582,286 A | 12/1996 | Kalm et al. | |
| 6,253,909 B1 | 7/2001 | Kalm et al. | |

(Continued)

FOREIGN PATENT DOCUMENTS

| | | | |
|---|---|---|---|
| CN | 209275436 U | 8/2019 | |
| DE | 3537135 A | * 4/1987 | B65G 21/02 |

OTHER PUBLICATIONS

Extended European Search Report Mailed on Jan. 13, 2025 for EP Application No. 24189966.5, 11 page(s).

*Primary Examiner* — Mark A Deuble
(74) *Attorney, Agent, or Firm* — Alston & Bird LLP

(57) ABSTRACT

Methods, systems, brackets, and/or the like are provided. In some embodiments, a multi-connection bracket (MCB) includes a bracket configured to connect a first rail section and a second rail section, wherein the bracket has one or more bracket recesses configured to receive one or more fasteners; and a grounding pad having a pad recess and a plurality of teeth, wherein the pad recess is aligned with at least one of the one or more bracket recesses, wherein the grounding pad is configured to receive the one or more fasteners such that the grounding pad is operably attached to the first rail section or the section rail section, and wherein the grounding pad is configured to deform when operably attached to the first rail section or the second rail section such that the plurality of teeth remove a coating of the first rail section or the second rail section.

19 Claims, 7 Drawing Sheets

(56)        References Cited

U.S. PATENT DOCUMENTS

| | | | |
|---|---|---|---|
| 6,843,364 B2 * | 1/2005 | Schmidt | B65G 19/287 |
| | | | 198/735.2 |
| 6,854,397 B2 | 2/2005 | Terajima et al. | |
| 7,070,040 B2 * | 7/2006 | Klabisch | B65G 19/287 |
| | | | 198/860.2 |
| 9,660,570 B2 * | 5/2017 | Stephan | F16B 5/0028 |
| 9,768,531 B1 | 9/2017 | Schlaupitz et al. | |
| 10,992,251 B2 * | 4/2021 | Zuritis | F24S 25/636 |
| 2013/0034409 A1 | 2/2013 | Haworth et al. | |

* cited by examiner

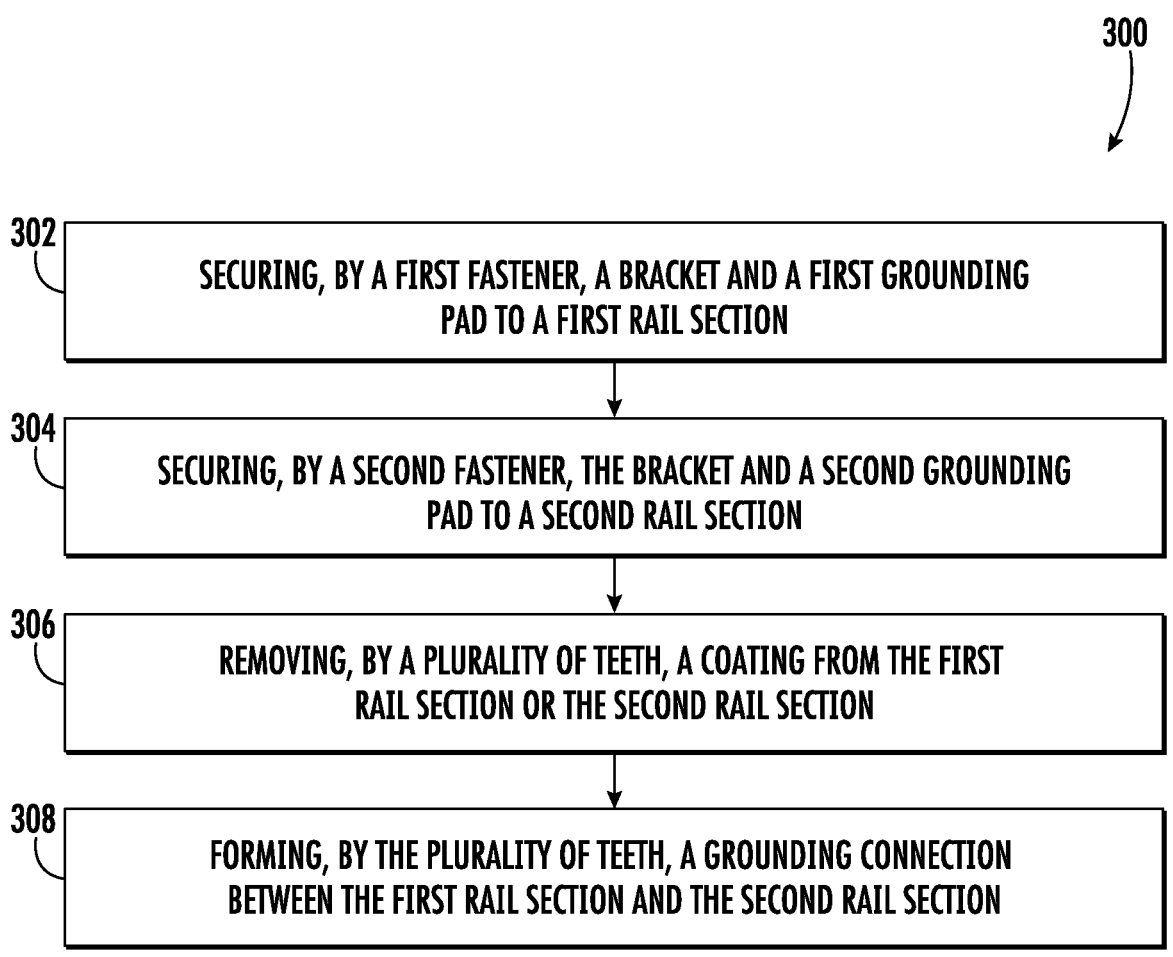

300

302 SECURING, BY A FIRST FASTENER, A BRACKET AND A FIRST GROUNDING
PAD TO A FIRST RAIL SECTION

304 SECURING, BY A SECOND FASTENER, THE BRACKET AND A SECOND GROUNDING
PAD TO A SECOND RAIL SECTION

306 REMOVING, BY A PLURALITY OF TEETH, A COATING FROM THE FIRST
RAIL SECTION OR THE SECOND RAIL SECTION

308 FORMING, BY THE PLURALITY OF TEETH, A GROUNDING CONNECTION
BETWEEN THE FIRST RAIL SECTION AND THE SECOND RAIL SECTION

FIG. 4

MULTI-CONNECTION BRACKET AND METHODS OF USE

TECHNICAL FIELD

The present disclosure relates generally to connection brackets. In particular, it relates to multi-connection brackets for connection conveyor sections of a conveyor system.

BACKGROUND

Brackets in conveyor systems may be used to connect two or more conveyor sections and thereby form a conveyor path. In addition to forming a physical connection, the two or more conveyor sections also have an electrical connection when attached by the bracket. Hence, there is a need for a separate grounding connection, such as from an electrical washer, which may create issues if/when the electrical washer degrades, such as after a dismantling of a grounding bolt connection.

Through applied effort, ingenuity, and innovation, the Applicant has solved problems relating to connection brackets by developing solutions embodied in the present disclosure, which are described in detail below.

SUMMARY

In general, embodiments of the present disclosure provide multi-connection brackets, conveyor systems, methods of use, and/or the like.

In accordance with various embodiments of the present disclosure, there is provided a multi-connection bracket (MCB) including a bracket configured to connect a first rail section and a second rail section, wherein the bracket has one or more bracket recesses configured to receive one or more fasteners; and a grounding pad including a pad recess and a plurality of teeth, wherein the pad recess is aligned with at least one of the one or more bracket recesses, wherein the grounding pad is configured to receive the one or more fasteners such that the grounding pad is operably attached to the first rail section or the section rail section, and wherein the grounding pad is configured to deform when operably attached to the first rail section or the second rail section such that the plurality of teeth remove a coating of the first rail section or the second rail section such that the grounding pad provides a grounding connection to the first rail section or the second rail section.

In some embodiments, the one or more bracket recesses include a first bracket recess and a second bracket recess, wherein the grounding pad includes a first grounding pad, the pad recess includes a first pad recess, and the plurality of teeth include a first plurality of teeth, and wherein the MCB further includes: a second grounding pad including a second pad recess and a second plurality of teeth, wherein the first bracket recess is aligned with the first pad recess and the second bracket recess is aligned with the second pad recess, wherein the first grounding pad is configured to receive at least one of the one or more fasteners such that the first grounding pad is operably attached to the first rail section, wherein the second grounding pad is configured to receive at least one of the one or more fasteners such that the second grounding pad is operably attached to the second rail section, and wherein the first grounding pad and the second grounding pad are configured to deform when operably attached to the first rail section and the second rail section, respectively, such that the first plurality of teeth and the second plurality of teeth remove a coating of the first rail section and the second rail section, respectively, such that the first grounding pad and the second grounding pad provide a grounding connection to the first rail section and the second rail section.

In some embodiments, the bracket further includes one or more cut out holes.

In some embodiments, the grounding pad includes a flexible, reusable pad configured to secure the one or more fasteners through the pad recess.

In some embodiments, the bracket is composed of a metal or a metallic alloy, is conductive, and is configured to allow elastic deformation after repeated usage.

In some embodiments, the bracket is surface treated with a composition including zinc and nickel.

In some embodiments, the first and second rail sections include first and second rail sections of a conveyor system.

In some embodiments, the bracket and the grounding pad include a single integrated piece.

In some embodiments, the coating is a conductive coating configured to provide corrosion resistance properties to the bracket.

According to various embodiments, there is provided a conveyor system including: a frame configured to receive a conveyor for supporting or transporting one or more objects, wherein the frame includes a first rail section and a second rail section; a bracket configured to connect the first rail section and the second rail section, wherein the bracket includes one or more bracket recesses configured to receive one or more fasteners; and a grounding pad including a pad recess and a plurality of teeth, wherein the pad recess is aligned with at least one of the one or more bracket recesses, wherein the grounding pad is configured to receive the one or more fasteners such that the grounding pad is operably attached to the first rail section or the section rail section, and wherein the grounding pad is configured to deform when operably attached to the first rail section or the second rail section such that the plurality of teeth remove a coating of the first rail section or the second rail section such that the grounding pad provides a grounding connection to the first rail section or the second rail section.

In some embodiments, the one or more bracket recesses include a first bracket recess and a second bracket recess, wherein the grounding pad includes a first grounding pad, the pad recess includes a first pad recess, and the plurality of teeth include a first plurality of teeth, and the MCB further include: a second grounding pad including a second pad recess and a second plurality of teeth, wherein the first bracket recess is aligned with the first pad recess and the second bracket recess is aligned with the second pad recess, wherein the first grounding pad is configured to receive at least one of the one or more fasteners such that the first grounding pad is operably attached to the first rail section, wherein the second grounding pad is configured to receive at least one of the one or more fasteners such that the second grounding pad is operably attached to the second rail, and wherein the first grounding pad and the second grounding pad are configured to deform when operably attached to the first rail section and the second rail section, respectively, such that the first plurality of teeth and the second plurality of teeth remove a coating of the first rail section and the second rail section, respectively, such that the first grounding pad and the second grounding pad provide a grounding connection to the first rail section and the second rail section.

In some embodiments, the bracket further includes one or more cut out holes.

In some embodiments, the grounding pad includes a flexible, reusable pad configured to secure the at least one fastener through the pad recess.

In some embodiments, the bracket is composed of a metal or a metallic alloy, is conductive, and is configured to allow elastic deformation after repeated usage.

In some embodiments, the backet is surface treated with a composition of zinc and nickel.

In some embodiments, the bracket and the grounding pad are a single integrated piece.

In some embodiments, the coating is a conductive coating configured to provide corrosion resistance properties to the bracket.

In some embodiments, the grounding pad is configured to resist a cyclic loading of the conveyor system.

According to various embodiments, there is provided a method of using an MCB, the method including: securing, by a first fastener, a bracket and a first grounding pad to a first rail section; securing, by a second fastener, the bracket and a second grounding pad to a second rail section; removing, by a plurality of teeth, a coating from the first rail section or the second rail section; and forming, by the plurality of teeth, a grounding connection between the first rail section and the second rail section.

The above summary is provided merely for purposes of summarizing some example embodiments to provide a basic understanding of some embodiments of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

FIG. 1C shows a side elevation view of an example MCB in accordance with various embodiments of the present disclosure;

FIG. 4 shows a flow chart illustrating an example method of using an example MCB in accordance with various embodiments of the present disclosure.

DETAILED DESCRIPTION OF SOME EXAMPLE EMBODIMENTS

Figure 1A:
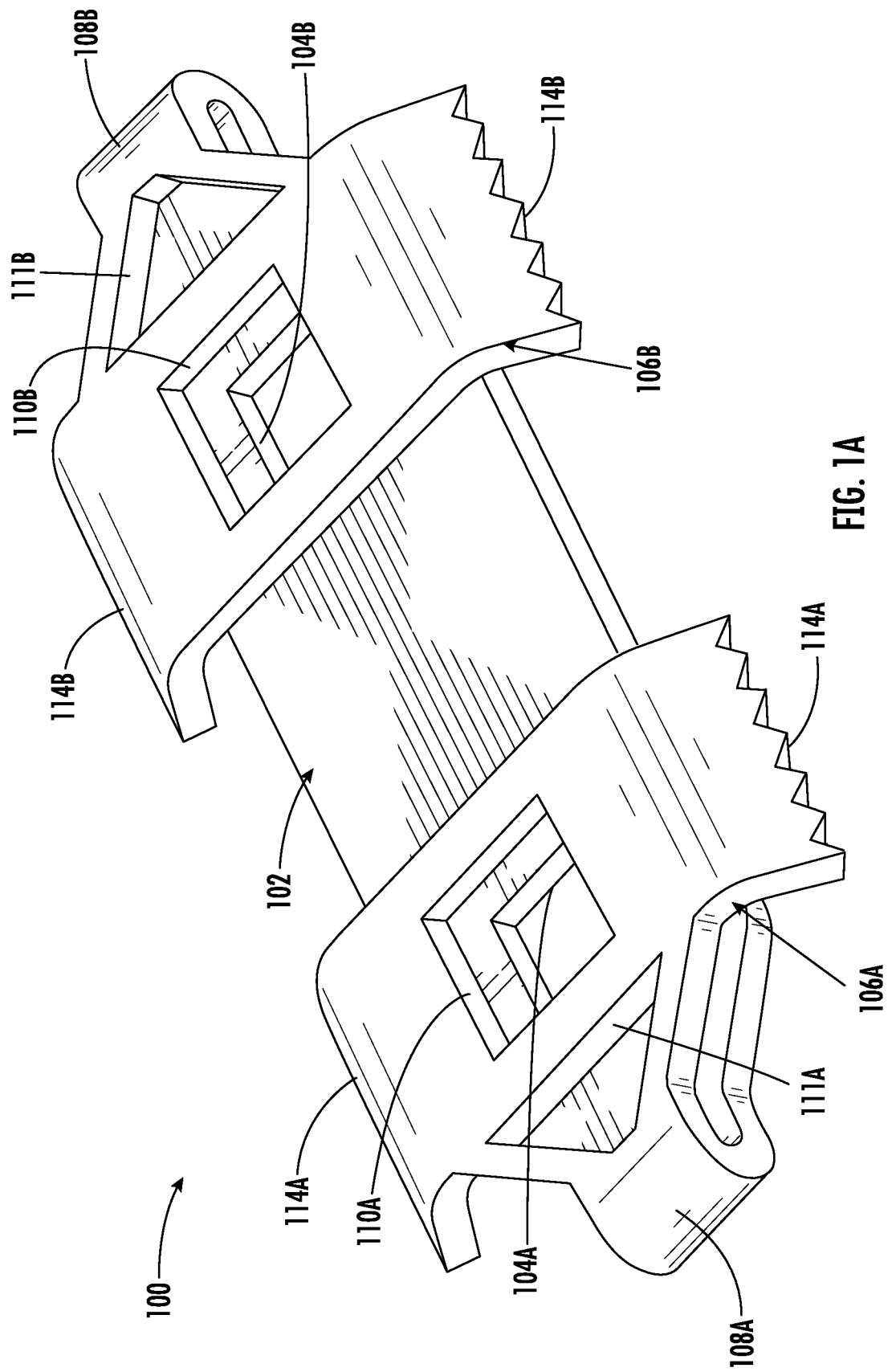
FIG. 1A shows an isometric view of an example multi-connection bracket (MCB) in accordance with various embodiments of the present disclosure.
Figure 1B:
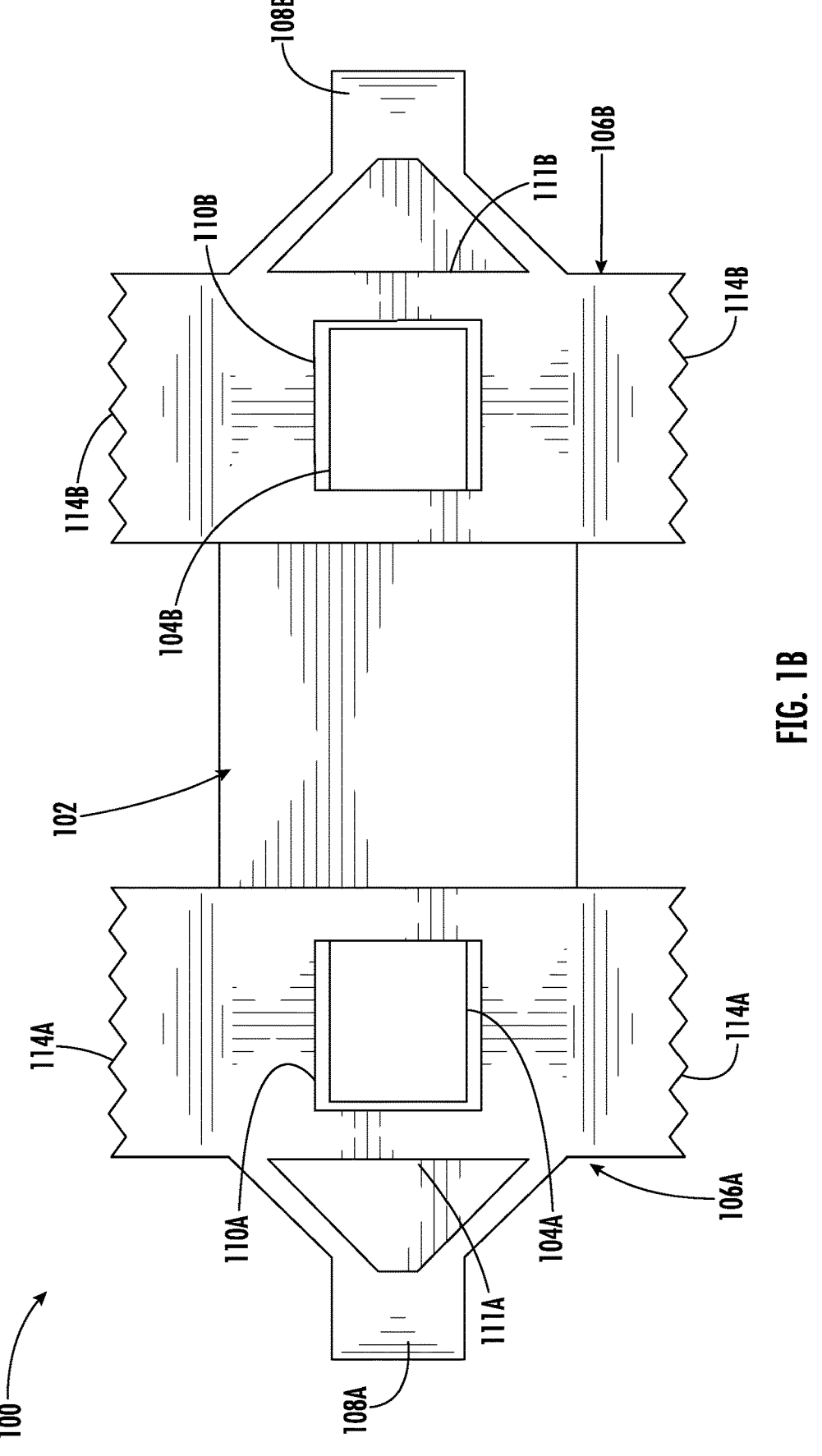
FIG. 1B shows a top plan view of an example MCB in accordance with various embodiments of the present disclosure.
Figure 1D:
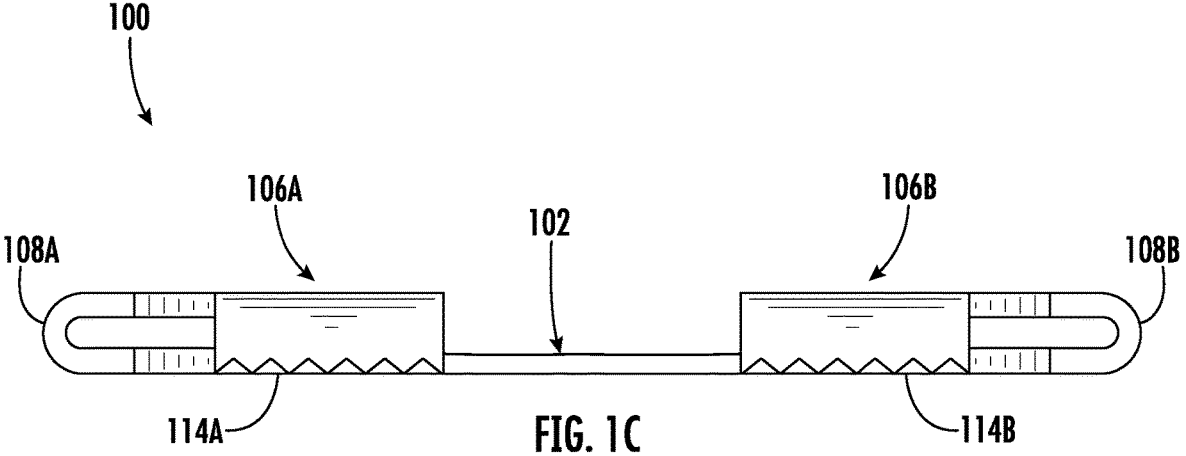
FIG. 1D shows a front elevation view of an example MCB in accordance with various embodiments of the present disclosure.
Figure 1D:
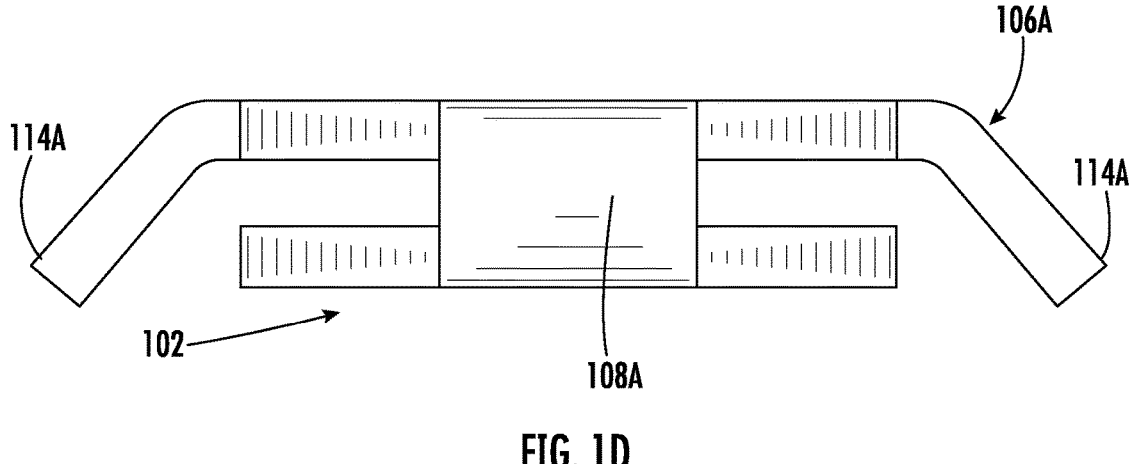

Various embodiments of the present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers may refer to like elements throughout. The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily may refer to the same embodiment).

Overview

According to various embodiments, a multi-connection bracket (MCB) may be used to connect one or more rail sections of a conveyor system. The MCB may include a bracket with one or more bracket recesses and one or more grounding pads, each having a pad recess aligned with the one or more bracket recesses. One or more fasteners may be disposed through the aligned recesses to secure the MCB to the one or more rail sections. The one or more grounding pads may also include a respective plurality of teeth that. When the MCB is secured to the one or more rail sections, the one or more grounding pads may deform, causing the plurality of teeth to contact the one or more rail sections and thereby remove a coating from the one or more rail sections. In at least this way, the one or more grounding pads may provide a grounding connection to the one or more rail sections.

Example Multi-Connection Brackets (MCBs)

FIGS. 1A-1D shows several different views of an example multi-connection bracket (MCB) 100, according to various embodiments. The MCB 100 may include a bracket 102 configured to connect one or more rail sections (e.g., a first rail section 202 and second rail section 204 of a conveyor rail 200, as shown in at least FIG. 2). In some embodiments, the bracket 102 may be a planar, rectangular metal (e.g., steel, phosphor-bronze) piece. The bracket 102 may be treated with a composition including zinc and nickel. In some embodiments, the bracket 102 may have one or more cut out portions forming one or more bracket recesses 104A, 104B. The bracket recesses 104A, 104B may be similarly rectangular or similarly shaped to provide mechanical connection(s). In some embodiments, the bracket recesses 104A, 104B may have dimensional tolerances that are adjusted according to various fasteners used with the MCB 100. In some embodiments, the bracket recesses 104A, 104B may mirror each other on the bracket 102. In some embodiments, the one or more bracket recesses 104A, 104B may be configured to receive one or more fasteners for securing the bracket 102 to the one or more rail sections 202, 204. For example, one or more bolts may be used to form the connection.

In some embodiments, the bracket 102 may include one or more fold-over areas 108A, 108B. These fold-over areas 108A, 108B may define one or more cut out holes 111A, 111B. The one or more cut out holes 111A, 111B may be triangular or a similar shape and disposed above at least a portion of the bracket 102. In some embodiments, the one or more cut-out holes 111A, 111B may be shaped to allow minor deformation near the fold-over areas 108A, 108B.

In some embodiments, the MCB 100 may include one or more grounding pads 106A, 106B. The grounding pads 106A, 106B may be substantially rectangular pieces disposed on top of the bracket 102. In some embodiments, the grounding pads 106A, 106B may be flexible, reusable pads configured to secure the one or more fasteners through the bracket recesses 104A, 104B. In some embodiments, the grounding pads 106A, 106B may be integrated with the bracket 102. The one or more grounding pads 106A, 106B may be connected to/integrated with the bracket 102 via the fold-over areas 108A, 108B of the bracket 102. The bracket 102 and the one or more grounding pads 106A, 106B may be integrated as a single piece, in some embodiments. In some embodiments, the one or more pad recesses 110A, 110B may be rectangular or similarly shaped to provide sufficient clearance for the movements of the pads 106A, 106B during tightening of one or more fasteners. The clearance enables the compensation of any asymmetric jamming of the teeth into the rail material.

In some embodiments, the grounding pads 106A, 106B may each include a pad recess 112A, 112B. The pad recesses 110A, 110B may be aligned with the one or more bracket recesses 104A, 104B. In some embodiments, the pad recesses 110A, 110B, similarly to the one or more bracket recesses 104A, 104B, may be configured to receive the one or more fasteners for securing the bracket 102 to the one or more rail sections (e.g., 202, 204).

In some embodiments, the grounding pads 106A, 106B may each include a plurality of teeth 114A, 114B. In some embodiments, the plurality of teeth 114A, 114B may be configured to remove a coating of the one or more rail sections when the MCB 100 connects the one or more rail sections (e.g., 202, 204).

Figure 2:
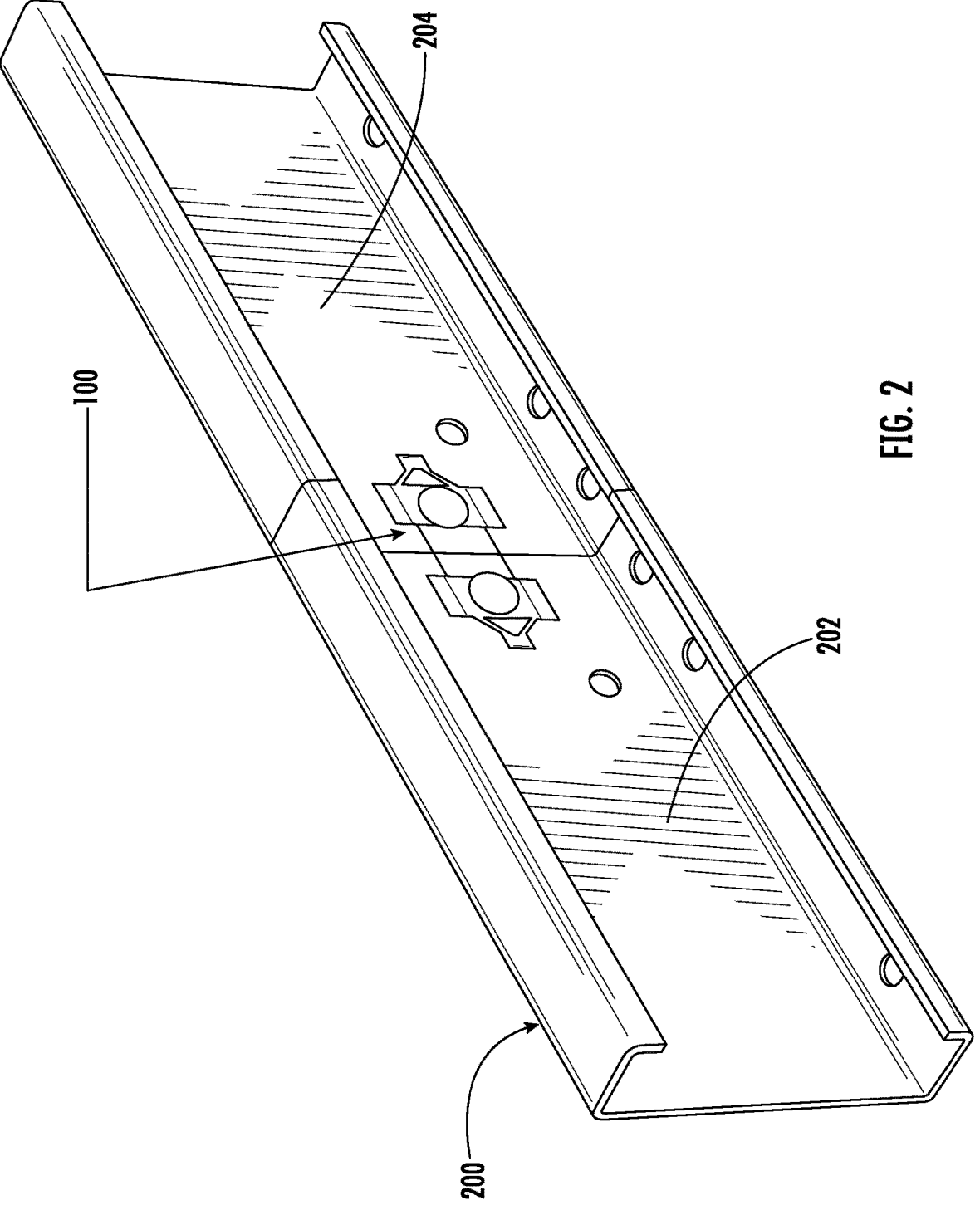
FIG. 2 shows an isometric view of an example MCB connecting two example rails in accordance with various embodiments of the present disclosure.

Referring now to FIG. 2, as previously described, the MCB 100 may be used to connect the rail sections of a conveyor rail 200 (which may be part of a larger conveyor system). In some embodiments, the MCB 100 may connect a first rail section 202 of a second rail section 204 of the conveyor rail 200. In some embodiments, the MCB 100 may physically connect the first rail section 202 and the second rail section 204, and the MCB 100 may also form an electrical grounding connection between the first rail section 202 and the second rail section 204. In some embodiments, the MCB 100 may be configured to attach and detach the conveyor sections 202, 204; that is, the one or more fasteners may be removed such that the MCB 100 may be removed from the conveyor sections 202, 204 and replaced, repaired, maintained, and/or the like.

Figure 3A:
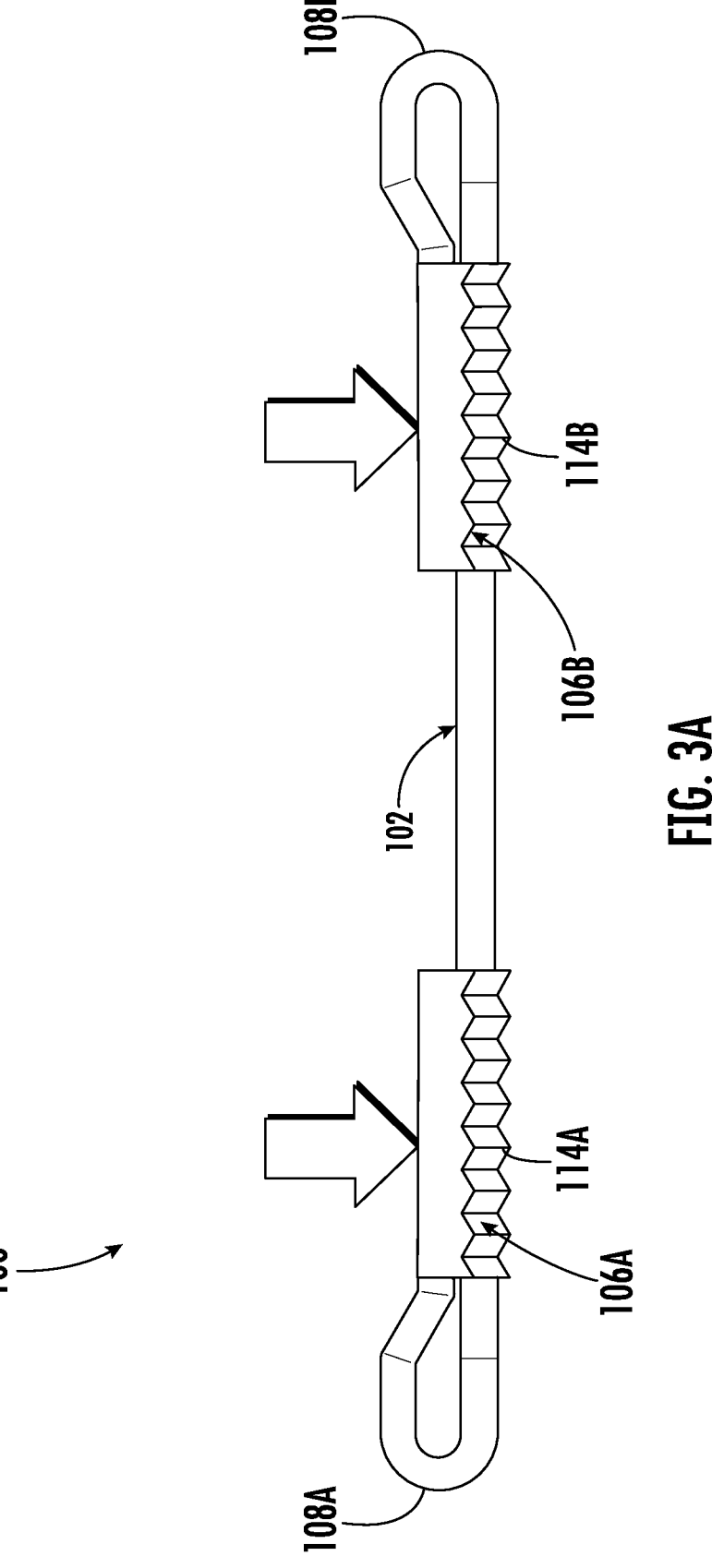
FIG. 3A shows a side elevation view of an example MCB in accordance with various embodiments of the present disclosure.
Figure 3B:
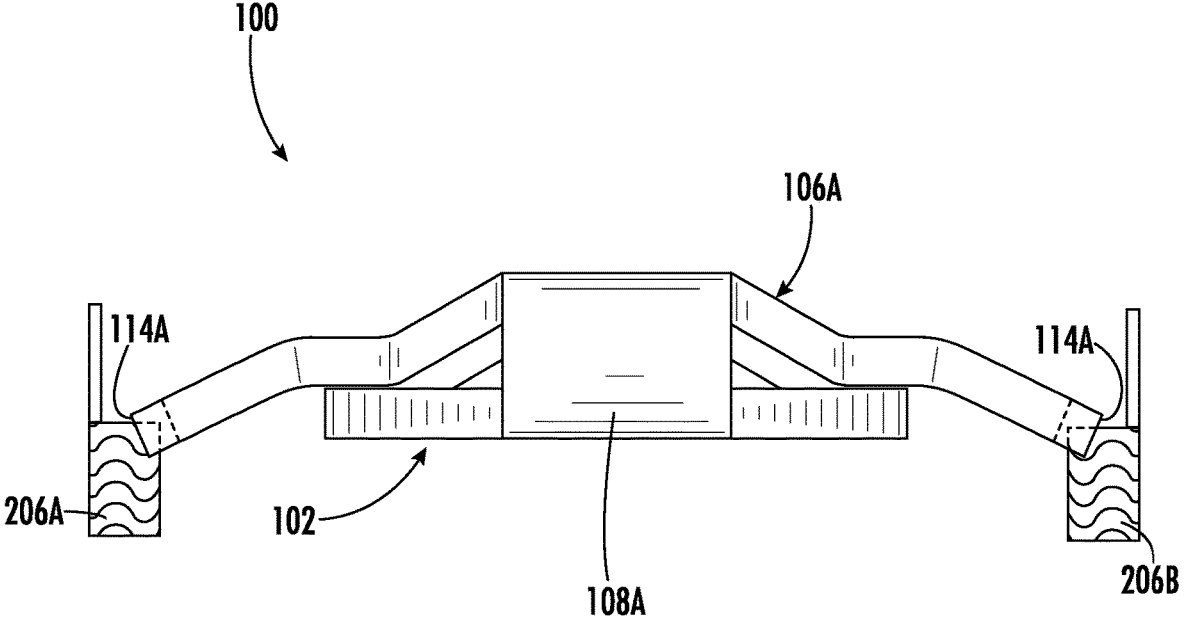
FIG. 3B shows a front elevation view of an example MCB in accordance with various embodiments of the present disclosure.

Referring now to FIGS. 3A and 3B, in some embodiments, the one or more grounding pads 106A, 106B may be configured to make the grounding connection to the first and second rail sections 202, 204. In some embodiments, once the one or more fasteners have been disposed through the pad recesses 110A, 110B, a pressure may be applied to grounding pads 106A, 106B. The grounding pads 106A, 106B may be configured to respond to such pressure by bending and/or flexing and/or deforming and/or the like such that the plurality of teeth 114A, 114B scratch away a coating (e.g., paint) of the first and/or second rails 202, 204; the teeth 114A, 114B may be configured to form an electrical grounding connection between one or more electrical contacts

206A, 206B of the first and/or the second rail 202, 204. It will be understood that the view shown in FIG. 3B is for purposes of illustration.

In some embodiments, the plurality of teeth 114A, 114B may be removed after they have scratched away the coating from the first and/or second rails 202, 204. That is, the grounding pads 106A, 106B may, in some embodiments, bend/flex/deform and/or the like away from the first and/or second rail such that the grounding pads 106A, 106B and the plurality of teeth 114A, 114B may be removed from the conveyor rail 200 for repair, replacement, maintenance, and/or the like. In some embodiments, the one or more grounding pads 106A, 106B may form a pre-stressed connection between the first and second rails 202, 204.

Example Uses of Multi-Connection Brackets
(MCBs)

FIG. 4 is a flow chart illustrating a method 300 of using an example MCB, according to some embodiments. The method 300 is described with respect to the MCB 100 and conveyor rail 200 as previously described, but it will be understood that the method 300 may be used with other brackets, systems, devices, and/or the like as desired.

In some embodiments, the method 300 may include a step 302 of securing, by a first fastener, a bracket and a first grounding pad to a first rail section. In some embodiments, the method 300 may include a step 304 of securing, by a second fastener, the bracket and a second grounding pad to a second rail section. In some embodiments, the method 300 may include a step 306 of removing, by a plurality of teeth, a coating from the first rail section or the second rail section. In some embodiments, the method 300 may include a step 308 of forming, by the plurality of teeth, a grounding connection between the first rail section and the second rail section.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A multi-connection bracket (MCB) comprising:
a bracket configured to connect a first rail section and a second rail section,
wherein the bracket comprises one or more bracket recesses configured to receive one or more fasteners; and
a grounding pad comprising a pad recess and a plurality of teeth,
wherein the pad recess is aligned with at least one of the one or more bracket recesses,
wherein the grounding pad is configured to receive the one or more fasteners such that the grounding pad is operably attached to the first rail section or the second rail section, and
wherein the grounding pad is configured to deform when operably attached to the first rail section or the second rail section such that the plurality of teeth remove a coating of the first rail section or the second rail section such that the grounding pad provides a grounding connection to the first rail section or the second rail section.

2. The MCB of claim 1, wherein the one or more bracket recesses comprise a first bracket recess and a second bracket recess, wherein the grounding pad comprises a first grounding pad, the pad recess comprises a first pad recess, and the plurality of teeth comprise a first plurality of teeth, and wherein the MCB further comprises:

a second grounding pad comprising a second pad recess and a second plurality of teeth, wherein the first bracket recess is aligned with the first pad recess and the second bracket recess is aligned with the second pad recess, wherein the first grounding pad is configured to receive at least one of the one or more fasteners such that the first grounding pad is operably attached to the first rail section, wherein the second grounding pad is configured to receive at least one of the one or more fasteners such that the second grounding pad is operably attached to the second rail section, and wherein the first grounding pad and the second grounding pad are configured to deform when operably attached to the first rail section and the second rail section, respectively, such that the first plurality of teeth and the second plurality of teeth remove the coating of the first rail section and the second rail section, respectively, such that the first grounding pad and the second grounding pad provide the grounding connection to the first rail section and the second rail section.

3. The MCB of claim 1, wherein the bracket further comprises one or more cut out holes.

4. The MCB of claim 1, wherein the grounding pad comprises a flexible, reusable pad configured to secure the one or more fasteners through the pad recess.

5. The MCB of claim 1, wherein the bracket is composed of a metal or a metallic alloy, is conductive, and is configured to allow elastic deformation after repeated usage.

6. The MCB of claim 1, wherein the bracket is surface treated with a composition comprising zinc and nickel.

7. The MCB of claim 1, wherein the first and second rail sections comprise first and second rail sections of a conveyor system.

8. The MCB of claim 1, wherein the bracket and the grounding pad comprise a single integrated piece.

9. The MCB of claim 1, wherein the coating comprises a conductive coating configured to provide corrosion resistance properties to the bracket.

10. A conveyor system comprising:

a frame configured to receive a conveyor for supporting or transporting one or more objects, wherein the frame comprises a first rail section and a second rail section;

a bracket configured to connect the first rail section and the second rail section, wherein the bracket comprises one or more bracket recesses configured to receive one or more fasteners; and a grounding pad comprising a pad recess and a plurality of teeth, wherein the pad recess is aligned with at least one of the one or more bracket recesses, wherein the grounding pad is configured to receive the one or more fasteners such that the grounding pad is operably attached to the first rail section or the second rail section, and wherein the grounding pad is configured to deform when operably attached to the first rail section or the second rail section such that the plurality of teeth remove a coating of the first rail section or the second rail section such that the grounding pad provides a grounding connection to the first rail section or the second rail section.

11. The conveyor system of claim 10, wherein the one or more bracket recesses comprise a first bracket recess and a second bracket recess, wherein the grounding pad comprises a first grounding pad, the pad recess comprises a first pad recess, and the plurality of teeth comprise a first plurality of teeth, and wherein the MCB further comprises:

a second grounding pad comprising a second pad recess and a second plurality of teeth, wherein the first bracket recess is aligned with the first pad recess and the second bracket recess is aligned with the second pad recess, wherein the first grounding pad is configured to receive at least one of the one or more fasteners such that the first grounding pad is operably attached to the first rail section, wherein the second grounding pad is configured to receive at least one of the one or more fasteners such that the second grounding pad is operably attached to the second rail section, and wherein the first grounding pad and the second grounding pad are configured to deform when operably attached to the first rail section and the second rail section, respectively, such that the first plurality of teeth and the second plurality of teeth remove the coating of the first rail section and the second rail section, respectively, such that the first grounding pad and the second grounding pad provide the grounding connection to the first rail section and the second rail section.

12. The conveyor system of claim 10, wherein the bracket further comprises one or more cut out holes.

13. The conveyor system of claim 10, wherein the grounding pad comprises a flexible, reusable pad configured to secure the at least one of the one or more fasteners through the pad recess.

14. The conveyor system of claim 10, wherein the bracket is composed of a metal or a metallic alloy, is conductive, and is configured to allow elastic deformation after repeated usage.

15. The conveyor system of claim 10, wherein the bracket is surface treated with a composition comprising zinc and nickel.

16. The conveyor system of claim 10, wherein the bracket and the grounding pad comprise a single integrated piece.

17. The conveyor system of claim 10, wherein the coating comprises a conductive coating configured to provide corrosion resistance properties to the bracket.

18. The conveyor system of claim 10, wherein the grounding pad is configured to resist a cyclic loading of the conveyor system.

19. A method of using an MCB, the method comprising:

securing, by a first fastener, a bracket and a first grounding pad to a first rail section;

securing, by a second fastener, the bracket and a second grounding pad to a second rail section;

removing, by a plurality of teeth, a coating from the first rail section or the second rail section; and forming, by the plurality of teeth, a grounding connection between the first rail section and the second rail section.

* * * * *